US010405609B2

(12) United States Patent
Orand

(10) Patent No.: US 10,405,609 B2
(45) Date of Patent: Sep. 10, 2019

(54) TRANSMISSION FOR MOTORIZED TENSIONING SYSTEM OF ARTICLE OF FOOTWEAR

(71) Applicant: NIKE, Inc., Beaverton, OR (US)

(72) Inventor: Austin Orand, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 57 days.

(21) Appl. No.: 15/459,566

(22) Filed: Mar. 15, 2017

(65) Prior Publication Data
US 2017/0265585 A1 Sep. 21, 2017

Related U.S. Application Data

(60) Provisional application No. 62/424,304, filed on Nov. 18, 2016, provisional application No. 62/308,628, filed on Mar. 15, 2016.

(51) Int. Cl.
A43B 3/00 (2006.01)
A43C 1/00 (2006.01)
(Continued)

(52) U.S. Cl.
CPC .......... *A43C 11/165* (2013.01); *A43B 3/0005* (2013.01); *A43B 13/14* (2013.01);
(Continued)

(58) Field of Classification Search
CPC ..... A43C 11/165; A43C 11/008; A43B 3/005; A43B 23/0245; A15H 1/20; A15H 1/22;
(Continued)

(56) References Cited

U.S. PATENT DOCUMENTS

RE25,960 E * 2/1966 Caley et al. .............. F16H 1/20
74/421 R
3,985,313 A * 10/1976 Klein .................... B21C 47/006
242/533.5
(Continued)

FOREIGN PATENT DOCUMENTS

CN 109068808 A 12/2018
WO 2017160997 9/2017

OTHER PUBLICATIONS

"International Application Serial No. PCT/US2017/022530, International Search Report dated Jun. 26, 2017", 4 pgs.
(Continued)

*Primary Examiner* — Jameson D Collier
*Assistant Examiner* — Heather N Mangine
(74) *Attorney, Agent, or Firm* — Schwegman Lundberg & Woessner, P.A.

(57) ABSTRACT

A tensioning system, method, and article of footwear includes a motor, a reel, and a transmission configured to transmit torque from the motor shaft to the reel shaft along a torque path to drive and rotate the reel shaft. The transmission has a compound gear. The compound gear includes a shaft gear, comprising an elongate shaft substantially parallel to the longitudinal axis and offset with respect to the motor shaft along the lateral axis, the shaft gear configured to rotate independent of a fixed reference, and operatively coupled the reel and a ring gear, fixedly coupled to a first end of the shaft gear and operatively coupled to the motor.

10 Claims, 8 Drawing Sheets

(51) Int. Cl.
*F16H 1/20* (2006.01)
*A43B 13/14* (2006.01)
*A43B 23/02* (2006.01)
*A43C 11/00* (2006.01)
*A43C 11/16* (2006.01)

(52) U.S. Cl.
CPC ............ *A43B 23/0245* (2013.01); *A43C 1/00* (2013.01); *A43C 11/008* (2013.01); *F16H 1/20* (2013.01)

(58) Field of Classification Search
CPC ............ Y10T 24/2183; Y10T 24/2187; B65H 75/4486; B65H 75/4484; B65H 2403/732
USPC .............. 36/50.1; 74/13, 331, 413; 242/390, 242/390.1, 390.8, 390.9; 254/134.4
See application file for complete search history.

(56) References Cited

U.S. PATENT DOCUMENTS

| | | | | | |
|---|---|---|---|---|---|
| 4,172,563 | A | * | 10/1979 | Werner | E06B 9/72 242/390.1 |
| 4,651,940 | A | * | 3/1987 | Nakamura | E06B 9/72 160/310 |
| 4,787,124 | A | * | 11/1988 | Pozzobon | A43C 11/165 24/68 SK |
| 4,787,569 | A | * | 11/1988 | Kanada | B60R 22/44 242/371 |
| 4,845,338 | A | * | 7/1989 | Lakic | A41D 19/001 219/211 |
| 5,038,629 | A | * | 8/1991 | Takimoto | F16H 1/20 74/421 A |
| 5,606,778 | A | * | 3/1997 | Jungkind | A43C 11/16 24/68 SK |
| 5,680,793 | A | * | 10/1997 | Flamang | F16H 1/20 74/325 |
| 6,045,478 | A | * | 4/2000 | Ziegler | F16H 37/041 475/207 |
| 6,058,793 | A | * | 5/2000 | Pasley | F16H 1/20 184/6.12 |
| 6,446,523 | B1 | * | 9/2002 | Ota | F16H 55/17 403/353 |
| 6,465,915 | B1 | * | 10/2002 | Kerdjoudj | F16H 37/041 310/40 MM |
| 6,601,467 | B1 | * | 8/2003 | Futterer | F16H 1/20 74/413 |
| 6,619,157 | B1 | * | 9/2003 | Morrow | F16H 1/22 74/410 |
| 6,666,103 | B2 | * | 12/2003 | Gotoh | B60K 6/36 74/412 R |
| 7,096,559 | B2 | * | 8/2006 | Johnson | A43B 11/00 29/433 |
| 7,506,833 | B2 | * | 3/2009 | Tanaka | B60R 22/44 180/268 |
| 7,584,528 | B2 | * | 9/2009 | Hu | A43C 11/16 24/68 SK |
| 7,591,050 | B2 | * | 9/2009 | Hammerslag | A43B 5/16 24/68 SK |
| 7,648,404 | B1 | * | 1/2010 | Martin | B63B 35/7936 114/39.19 |
| 7,721,468 | B1 | * | 5/2010 | Johnson | A43C 1/06 36/118.1 |
| 7,752,774 | B2 | * | 7/2010 | Ussher | A43B 3/0005 36/100 |
| 7,775,473 | B2 | * | 8/2010 | Mori | B60R 22/46 242/374 |
| 8,015,900 | B2 | * | 9/2011 | Gmirya | B64C 27/12 74/409 |
| 8,046,937 | B2 | * | 11/2011 | Beers | A43B 3/0005 36/50.1 |
| 8,925,701 | B1 | * | 1/2015 | Dube | F16D 27/14 192/3.51 |
| 2002/0011537 | A1 | * | 1/2002 | Durrstein | B60R 22/343 242/390.8 |
| 2003/0150135 | A1 | * | 8/2003 | Liu | A43B 3/0005 36/50.1 |
| 2003/0177662 | A1 | * | 9/2003 | Elkington | A43C 1/00 36/50.1 |
| 2004/0075009 | A1 | * | 4/2004 | Mori | B60R 22/46 242/390.8 |
| 2004/0108155 | A1 | * | 6/2004 | Mori | B60R 22/44 180/268 |
| 2004/0250639 | A1 | * | 12/2004 | Winkler | B29C 47/0801 74/413 |
| 2005/0011983 | A1 | * | 1/2005 | Inuzuka | B60R 22/46 242/390.9 |
| 2005/0012320 | A1 | * | 1/2005 | Tobata | B60R 22/46 280/806 |
| 2005/0028627 | A1 | * | 2/2005 | Fleytman | F16H 1/08 74/416 |
| 2005/0140082 | A1 | * | 6/2005 | Jung-Yun | B65H 5/062 271/121 |
| 2006/0071111 | A1 | * | 4/2006 | Tanaka | B60R 22/46 242/374 |
| 2006/0117885 | A1 | * | 6/2006 | Robson | B60T 13/02 74/413 |
| 2006/0261589 | A1 | * | 11/2006 | Tanaka | B60R 22/02 280/806 |
| 2007/0000154 | A1 | * | 1/2007 | DiBenedetto | A43B 1/0036 36/132 |
| 2007/0084956 | A1 | * | 4/2007 | Chen | A43C 7/00 242/388.6 |
| 2008/0302289 | A1 | * | 12/2008 | Mann | B66D 1/7426 114/102.1 |
| 2010/0264245 | A1 | * | 10/2010 | Ando | B60R 22/46 242/390 |
| 2011/0030491 | A1 | * | 2/2011 | Leimann | F16H 57/02004 74/413 |
| 2012/0080652 | A1 | * | 4/2012 | Mann | B66D 1/7426 254/334 |
| 2012/0202641 | A1 | * | 8/2012 | Sappenfield | A61C 17/26 475/337 |
| 2013/0126659 | A1 | * | 5/2013 | Nakada | B65H 23/182 242/420.4 |
| 2013/0241145 | A1 | * | 9/2013 | Yasukawa | B65H 7/12 271/272 |
| 2014/0068838 | A1 | * | 3/2014 | Beers | A61F 5/028 2/243.1 |
| 2014/0082963 | A1 | * | 3/2014 | Beers | A43C 11/00 36/83 |
| 2015/0075732 | A1 | * | 3/2015 | Kirby | E06B 9/72 160/310 |
| 2015/0250268 | A1 | * | 9/2015 | Alt | A43C 11/20 24/68 SK |
| 2015/0284990 | A1 | * | 10/2015 | Hall | E06B 9/303 74/606 R |
| 2016/0160961 | A1 | * | 6/2016 | Biro | H02K 5/10 74/414 |
| 2016/0316721 | A1 | * | 11/2016 | Xie | A01K 15/025 |
| 2017/0023103 | A1 | * | 1/2017 | Liu | F16H 1/20 |
| 2017/0072561 | A1 | * | 3/2017 | Schlegel | A61B 34/70 |
| 2017/0265586 | A1 | * | 9/2017 | Schneider | A43B 3/0005 |
| 2018/0343978 | A1 | * | 12/2018 | Stillman | A43C 11/165 |

OTHER PUBLICATIONS

"International Application Serial No. PCT/US2017/022530, Written Opinion dated Jun. 26, 2017", 5 pgs.
"International Application Serial No. PCT US2017 022530, International Preliminary Report on Patentability dated Sep. 27, 2018", 7 pgs.
"European Application Serial No. 17767440.5, Response Filed Feb. 1, 2019 to Communication pursuant to Rules 161(2) and 162 EPC dated Nov. 2, 2018", 11 pgs.

* cited by examiner

TRANSMISSION FOR MOTORIZED TENSIONING SYSTEM OF ARTICLE OF FOOTWEAR

PRIORITY

This application claims the benefit of priority to U.S. Provisional Application No. 62/308,628, filed Mar. 15, 2016, titled "Transmission For Motorized Tensioning System of Article of Footwear", and to U.S. Provisional Application No. 62/424,304, filed Nov. 18, 2016, titled "Transmission For Motorized Tensioning System of Article of Footwear", both of which are incorporated by reference herein in their entirety.

TECHNICAL FIELD

The subject matter disclosed herein relates generally to a transmission for a motorized tensioning system for footwear.

BACKGROUND

Articles of footwear generally include two primary elements: an upper and a sole structure. The upper can include one or more elements that are configured to fit around and receive a foot. In some embodiments, the upper can form structure that extends over instep and toe areas of the foot, along medial and lateral sides of the foot, and around a heel area of the foot. The upper may also incorporate a securement system, such as a shoelace, straps, or other members, that can be used to adjust the fit of the footwear. The securement system can also permit entry and removal of the foot from the void within the upper.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like reference numerals designate corresponding parts throughout the different views.

DETAILED DESCRIPTION

Example methods and systems are directed to a transmission for a motorized tensioning system for footwear. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without each or all of these specific details.

Articles of footwear have conventionally utilized lacing mechanisms that involve manual manipulation of laces or other mechanisms, e.g., manually tying the laces, to secure the article of footwear to a foot of a wearer. However, alternative mechanisms have been developed that provide for the tightening of laces, cables, and the like utilizing motors, transmissions, and gears. Because such motors, transmissions, and gears may necessarily be contained within the article of footwear, may need to tighten the laces sufficient to hold the article of footwear in place during vigorous physical activity, and may need to be manufactured within typical cost restrictions of articles of footwear, the mechanical properties of such motors and gears may be relatively constrained in relation to various other implementations of motors, transmissions, and gears. In particular, factors such as size, torque, manufacturing yield, and cost may be relatively difficult to rationalize.

A motorized lacing tensioning system has been developed which utilizes a transmission with compound gear with a ring gear and elongate shaft gear as separate components. The separate components of the compound gear may, in conjunction with other components of the transmission, provide for certain advantages in not seen in alternative examples of tensioning system transmissions, including an improved manufacturing process and adaptability of the compound gear to modifications of the design to the transmission. Further, the compound gear may allow for a relatively compact transmission that may be effectively integrated with the rest of the tensioning system.

Figure 1:
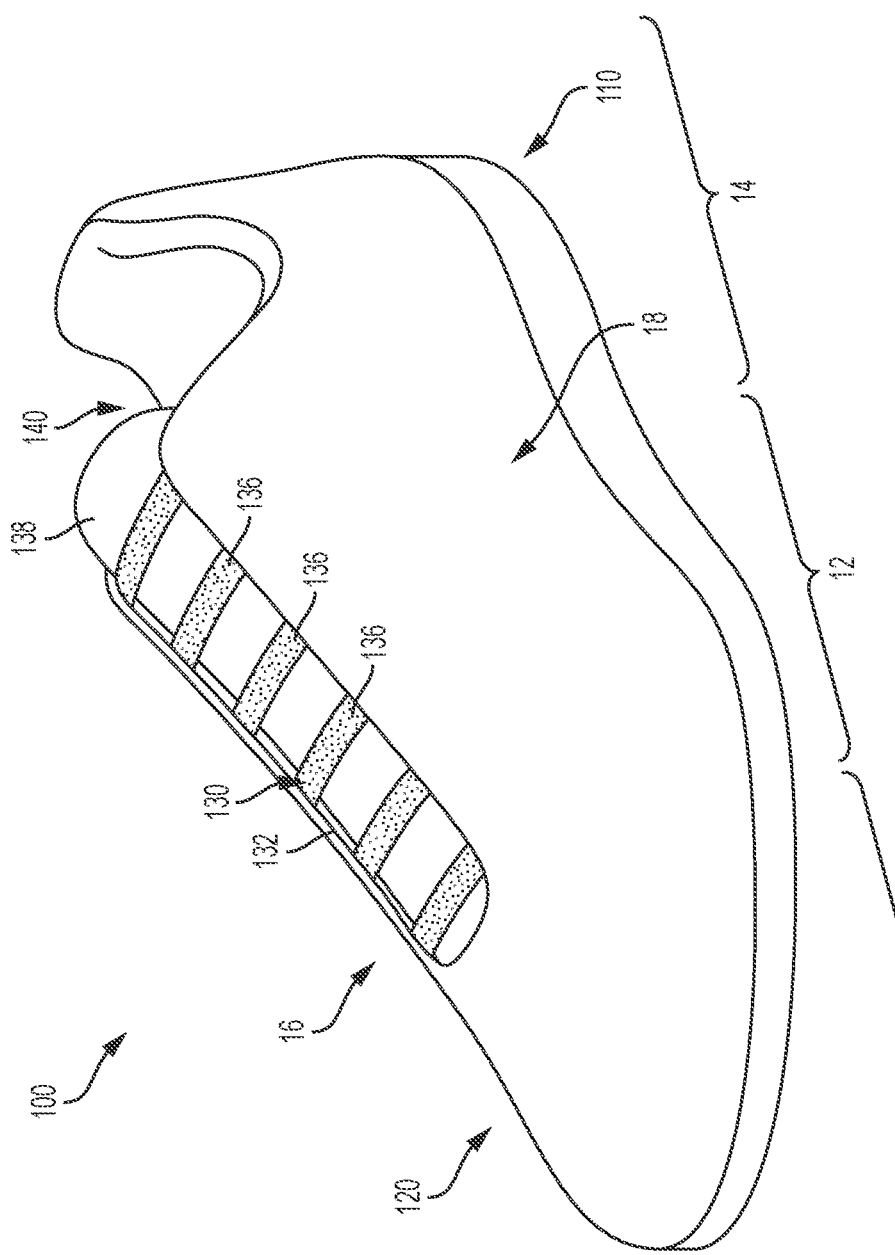
FIG. 1 is an isometric view of an article of footwear according to exemplary embodiments of the present disclosure.
Figure 2:
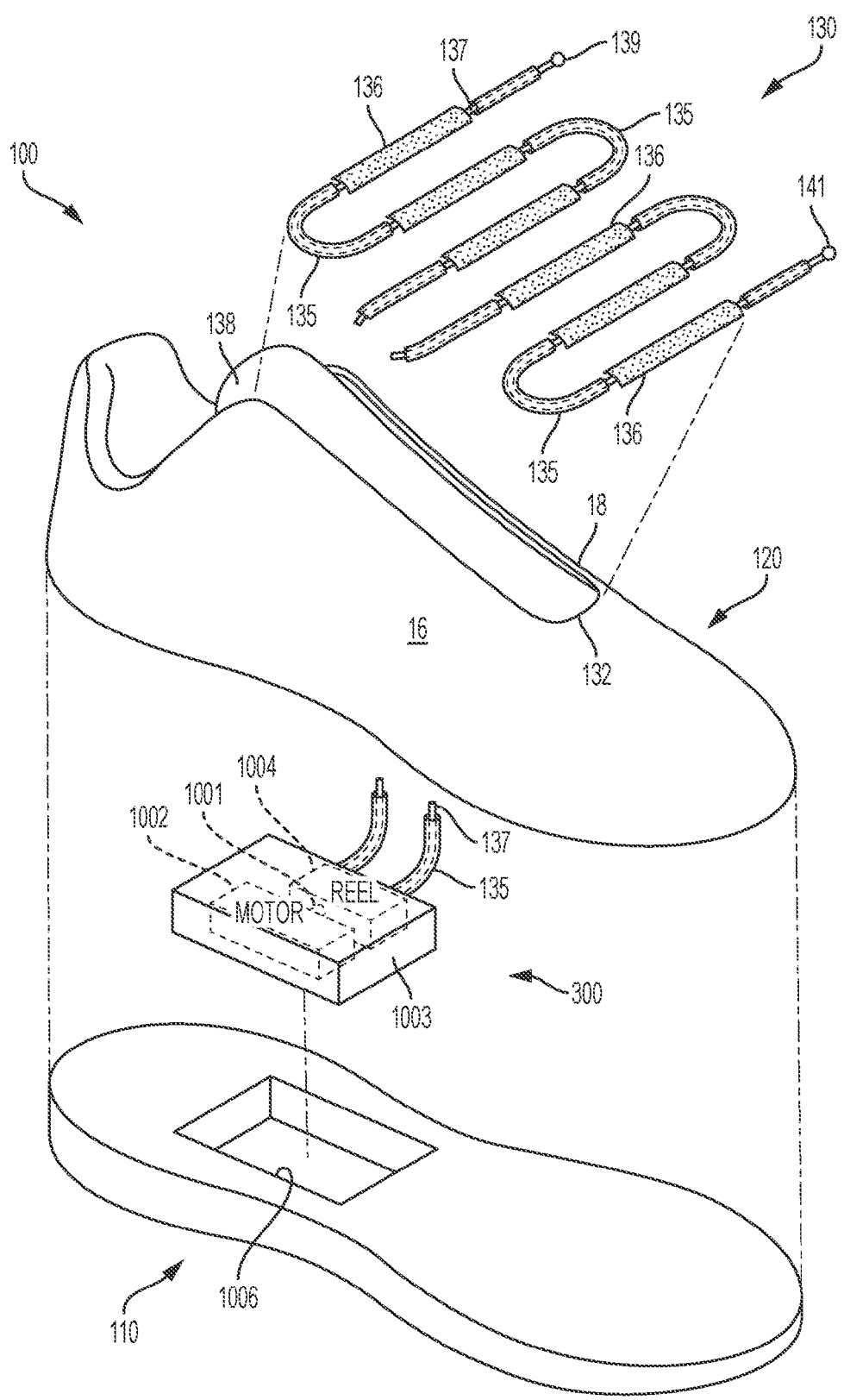
FIG. 2 is an exploded view of the article of footwear of FIG. 1.
Figure 3:
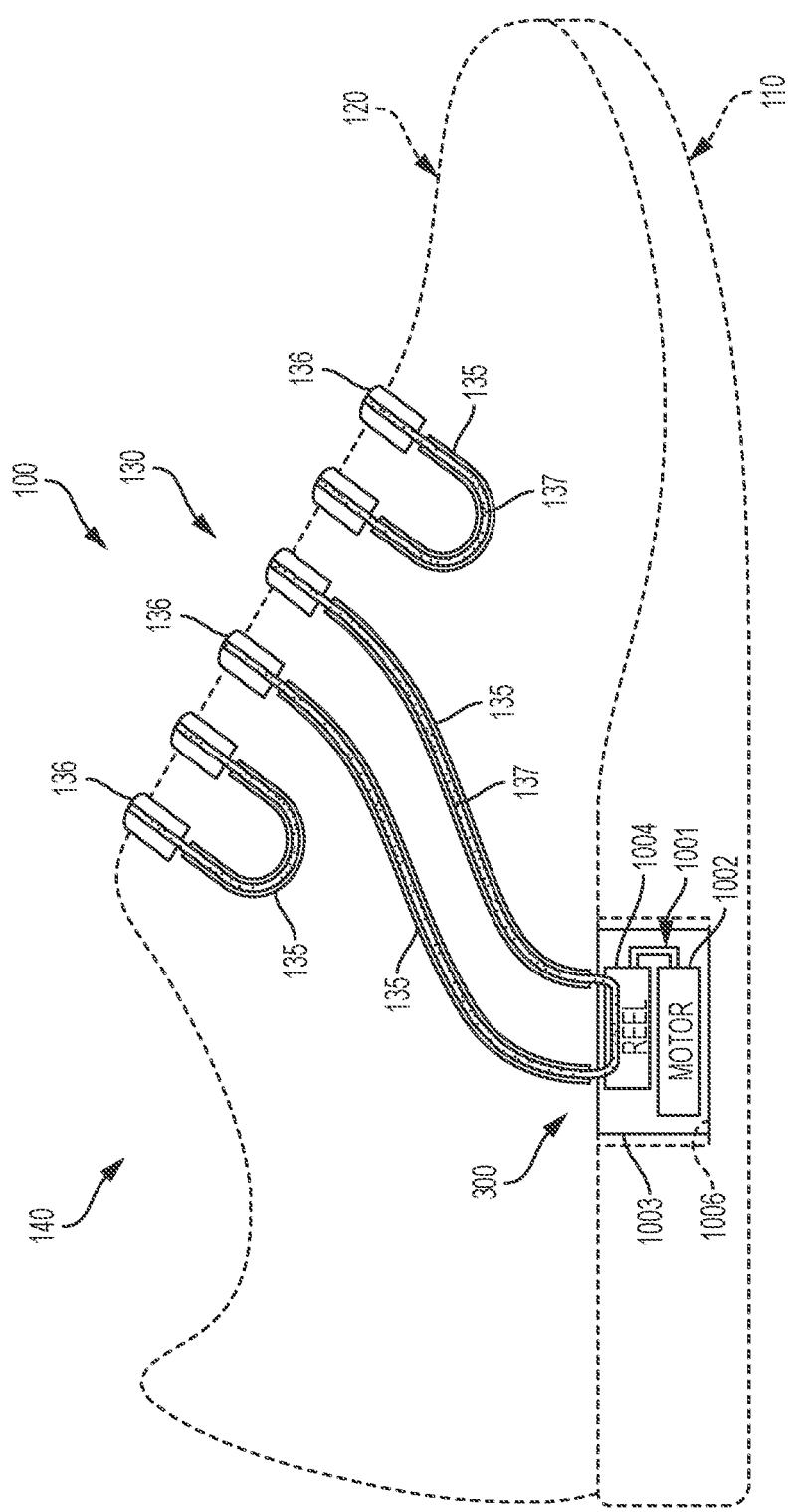
FIG. 3 is a side view of the article of the article of footwear of FIG. 1.

FIGS. 1-3 illustrate an exemplary embodiment of an article of footwear 100. As shown in FIGS. 2 and 3, the article of footwear 100 can include a securement system 130 and a tensioning system 300. Various features of the footwear 100, the securement system 130, and tensioning system 300 will be discussed in detail below. It will be appreciated that the footwear 100, securement system 130, and tensioning system can incorporate features described in one or more of the documents U.S. patent application Ser. No. 14/723,972, filed May 28, 2015, and U.S. patent application Ser. No. 15/070,158, filed Mar. 15, 2016, both of which are incorporated by reference in their entirety.

As will be discussed in detail, the securement system 130 can be used for selectively securing the footwear 100 to the wearer's foot and for selectively releasing the footwear 100 from the wearer's foot. Stated differently, the securement system 130 can tighten and secure the footwear 100 to the foot, and the securement system 130 can loosen and release the footwear 100 from the foot. In other words, the securement system 130 can move the footwear 100 between a secured position and a loosened position relative to the wearer's foot.

The tensioning system 300 can be used for actuating the securement system 130. As such, the tensioning system 300 can be used to automatically secure the footwear 100 to the foot and/or to automatically loosen the footwear 100 from the foot.

The tensioning system 300 can be robust due to one or more features that will be discussed in detail below. As such, the tensioning system 300 can ensure that the footwear 100 will tighten and stay secured on the foot, even under relatively high loads that act to loosen the footwear 100 from the foot. Additionally, the tensioning system 300 can be configured so that the footwear 100 efficiently and effectively loosens from the foot when the wearer so chooses.

Also, the tensioning system 300 can be compact and lightweight. As such, the tensioning system 300 can be packaged within the footwear 100 inconspicuously.

Additionally, the tensioning system 300 can have a relatively simple design. For example, the tensioning system 300 can have a low total part count. Furthermore, the tensioning system 300 can have high manufacturability.

In the current embodiment of FIGS. 1-3, the article of footwear 100 is shown in the form of an athletic shoe. However, in other embodiments, the securement system 130 and tensioning system 300 can be used with any other kind of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments the article of footwear 100 can be configured for use with various kinds of non-sports related footwear, including, but not limited to: slippers, sandals, high heeled footwear, loafers as well as any other kinds of footwear. As discussed in further detail below, the tensioning system 300 may not be limited to footwear. For example, the tensioning system 300 can be used with sportswear, other clothing and apparel, sporting equipment, medical braces, and more without departing from the scope of the present disclosure.

For reference purposes, the article of footwear 100 can be divided into three general regions: a forefoot region 10, a midfoot region 12, and a heel region 14, each of which is indicated in FIG. 1. The forefoot region 10 generally includes portions of the article of footwear 100 corresponding with the toes and the joints connecting the metatarsals with the phalanges. The midfoot region 12 generally includes portions of the article of footwear 100 corresponding with an arch area of the foot. The heel region 14 generally corresponds with rear portions of the foot, including the calcaneus bone. The article of footwear 100 also includes a medial side 16 and a lateral side 18, which extend through each of the forefoot region 10, the midfoot region 12, and the heel region 14 and correspond with opposite sides of the article of footwear 100. More particularly, the medial side 16 corresponds with an inside area of the foot (i.e., the surface that faces toward the other foot), and the lateral side 18 corresponds with an outside area of the foot (i.e., the surface that faces away from the other foot). The forefoot region 10, midfoot region 12, heel region 14, medial side 16, and lateral side 18 are not intended to demarcate precise areas of article 100. Rather, the forefoot region 10, midfoot region 12, heel region 14, medial side 16, and lateral side 18 are intended to represent general areas of the article of footwear 100 to aid in the following discussion. In addition, the forefoot region 10, midfoot region 12, heel region 14, medial side 16, and lateral side 18 can also be applied to a sole structure, an upper, or other individual elements of the article of footwear 100.

In some embodiments, the article of footwear 100 can include a sole structure 110 and an upper 120. The sole structure 110 can be configured to provide traction for the article of footwear 100. In addition to providing traction, the sole structure 110 can attenuate ground reaction forces when compressed between the foot and the ground during walking, running or other ambulatory activities. The configuration of the sole structure 110 can vary significantly in different embodiments to include a variety of conventional or non-conventional structures. In some cases, the configuration of the sole structure 110 can be configured according to one or more types of ground surfaces on which the sole structure 110 can be used. Examples of ground surfaces include, but are not limited to: natural turf, synthetic turf, dirt, as well as other surfaces.

In different embodiments, the sole structure 110 can include different components. For example, the sole structure 110 can include an outsole, a midsole, and/or an insole. In addition, in some cases, the sole structure 110 can include one or more cleat members or traction elements that are configured to increase traction with a ground surface.

In an exemplary embodiment, the sole structure 110 is secured to the upper 120 and extends between the foot and the ground when the article of footwear 100 is worn. The upper 120 defines an interior void within the article of footwear 100 for receiving and securing a foot relative to the sole structure 110. The void is shaped to accommodate the foot and can extend along the lateral side of the foot, along a medial side of the foot, over the foot, around the heel, and under the foot.

The upper 120 can also include a collar that is located in at least the heel region 14 and that forms a throat opening 140. Access to the interior void of upper 120 can be provided by the throat opening 140. More particularly, the foot can be inserted into the upper 120 through the throat opening 140, and the foot can be withdrawn from the upper 120 through the throat opening 140.

The upper 120 can also include a lacing area 132. In some embodiments, the lacing area 132 can be an opening extending from the throat opening 140 toward the forefoot region 10 and defined between the medial side 16 and the lateral side 18. The upper 120 can additionally include a tongue 138 in some embodiments. The tongue 138 can be disposed within the lacing area 132.

As shown in the embodiment of FIGS. 1-3, the securement system 130 can include one or more strap members 136 that extend across portions of the lacing area 132. Furthermore, as shown in FIGS. 2 and 3, the securement system 130 can also include at least one tensioning member 137. The tensioning member 137 can be a shoelace, a cable, or other elongate member. The tensioning member 137 can also be flexible, but the tensioning member 137 can have a substantially fixed length in some embodiments. The tensioning member 137 can extend through one or more of the strap members 136. Other portions of the tensioning member 137 can extend through hollow, elongate guide members 135. Moreover, in some embodiments, the tensioning member 137 and the guides 135 can be enclosed by the upper 120 of the article of footwear 100.

In some embodiments, the tensioning member 137 can extend in a serpentine fashion through the strap members 136 and the guides 135 as shown in FIG. 2. Also, the tensioning member 137 can extend along the lacing area 132, alternating between the medial side 16 and the lateral side 18 of the article of footwear 100. Moreover, a first end 139 of the tensioning member 137 can be fixed to the upper 120 and/or the sole structure 110. Likewise, a second end 141 of the tensioning member 137 can be fixed to the upper 120 and/or the sole structure 110.

Additionally, in some embodiments, the tensioning member 137 can be attached to the tensioning system 300, which is shown schematically in FIGS. 2 and 3. As will be discussed, the tensioning system 300 can include a motor 1002 and a reel 1004. In some embodiments, the motor 1002 and reel 1004 can be encapsulated and supported within a housing 1003. Additionally, the housing 1003 can be received within a pocket 1006 defined within the article of footwear 100, for example, within the sole structure 110.

The motor 1002 can selectively drive the reel 1004 so that the reel 1004 winds, and the tensioning member 137 spools on the reel 1004. The tensioning member 137, in turn, can tighten the straps 136 against the wearer's foot for securing the upper 120 to the foot. Additionally, in some embodiments, the motor 1002 can unwind the reel 1004 so that the tensioning member 137 unspools from the reel 1004 and the straps 136 loosen.

The tensioning system 300 can also include a transmission 1001 that operably couples the motor 1002 to the reel 1004. The transmission 1001 can also be encapsulated and supported within the housing 1003. Generally, in some embodiments, the transmission 1001 can transfer power and torque from the motor 1002 to the reel 1004.

The transmission 1001 can include one or more features that ensure the tensioning system 300 can secure the footwear 100 to the foot and retain the footwear 100 in the secured position. For example, the transmission 1001 can provide a relatively high gear ratio for these purposes. Also, the transmission 1001 can be compact and lightweight. Moreover, the transmission 1001 can avoid the need for a clutch and or brake. Instead, the transmission 1001 can provide a single, consistent gear reduction.

Figure 4A:
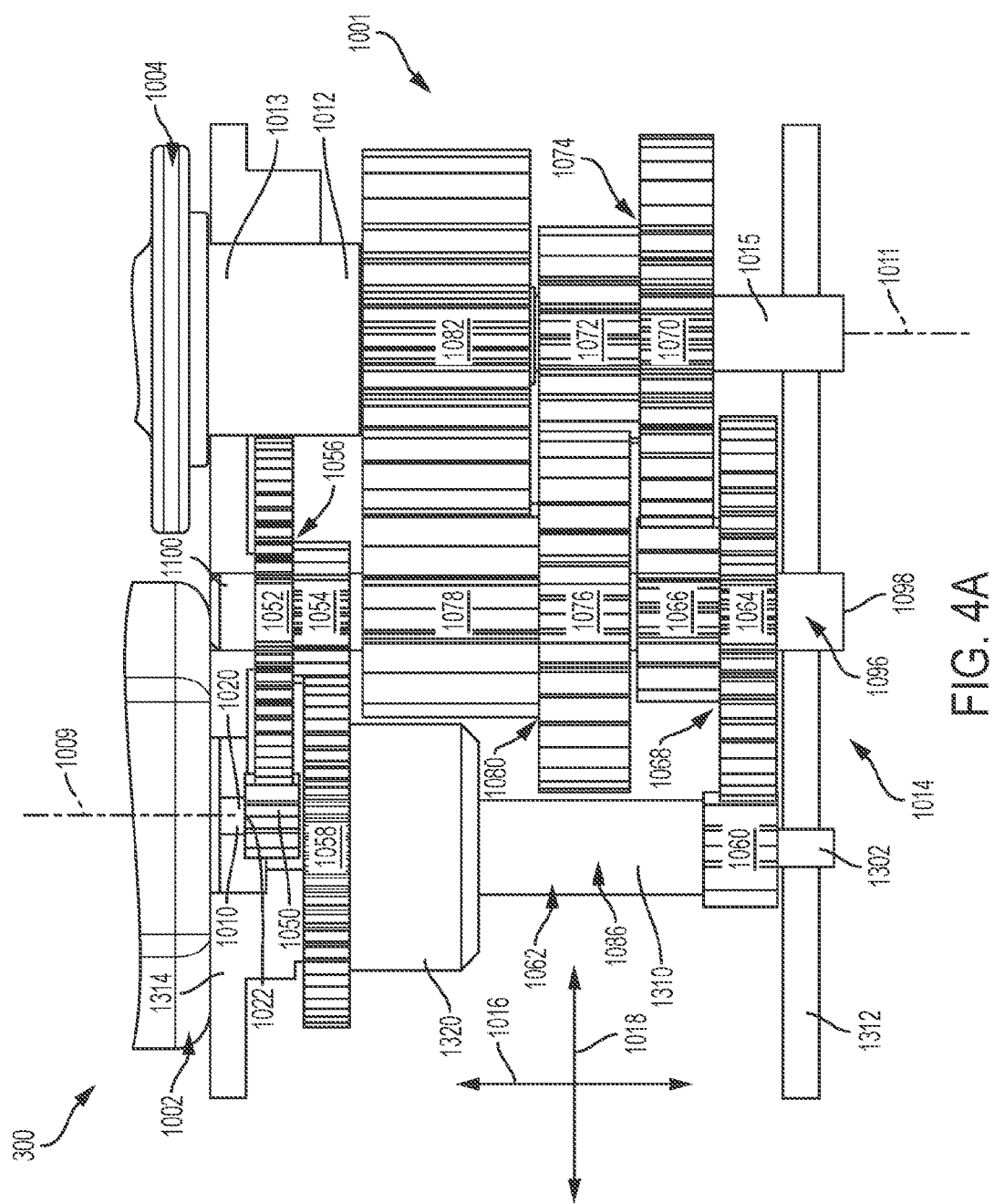
FIGS. 4A and 4B are external and cutaway depictions, respectively, of the transmission 1001 in relation to the tensioning system 300, in an example embodiment.
Figure 4B:
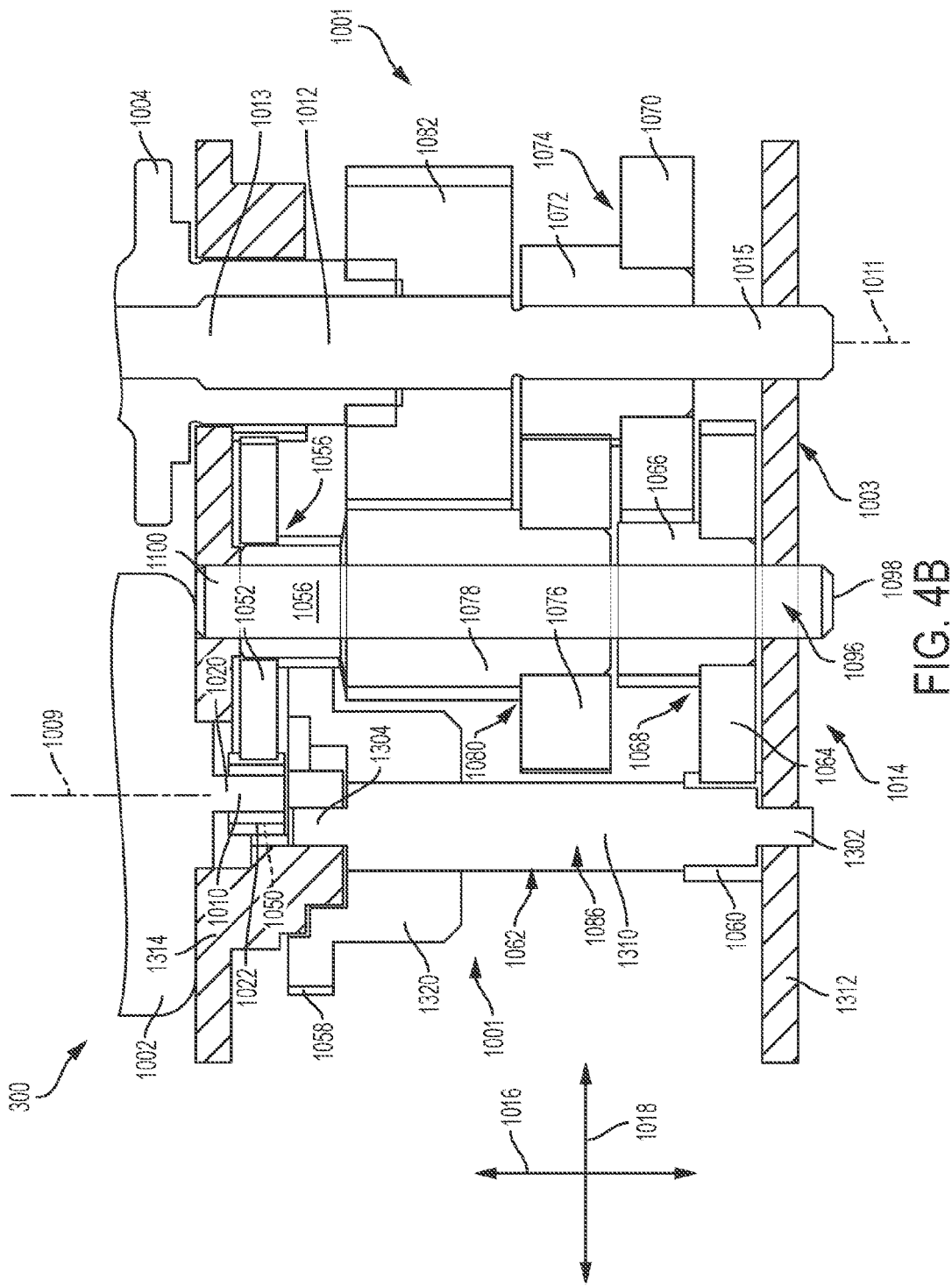

FIGS. 4A and 4B are external and cutaway depictions, respectively, of the transmission 1001 in relation to the tensioning system 300, in an example embodiment. The transmission 1001 can be arranged relative to a longitudinal axis 1016 and a transverse, lateral axis 1018. It will be appreciated that the longitudinal axis 1016 and lateral axis 1018 are included for reference purposes and to aid in the discussion of the transmission 1001.

The motor 1002 can be of any suitable type, such as an electric motor. Also, the reel 1004 can be rotatable. As the reel 1004 rotates in one direction, the reel 1004 can take up slack and increase tension in the tensioning member 137 (FIG. 3) for tightening the footwear 100 on the wearer's foot. As the reel 1004 rotates in the opposite direction, the tensioning member 137 can unwind from the reel 1004 so that tension in the tensioning member 137 decreases and so that the footwear 100 loosens from the foot.

The motor 1002 can include a motor shaft 1010, and the reel 1004 can include a reel shaft 1012. The motor shaft 1010 can include a first end 1020 and a second end 1022. The reel shaft 1012 can also include a first end 1013 and a second end 1015. In some embodiments, the motor shaft 1010 can be elongate with a substantially straight longitudinal axis 1009. Likewise, in some embodiments, the reel shaft 1012 can be elongate with a substantially straight longitudinal axis 1011. The motor shaft 1010 can rotate about the axis 1009, and the reel shaft 1012 can rotate about the axis 1011. Thus, the axis 1009 can be an axis of rotation for the motor shaft 1010, and the axis 1011 can be an axis of rotation for the reel shaft 1012.

In some embodiments, both the axis 1009 of the motor shaft 1010 and the axis 1011 of the reel shaft 1012 can be substantially parallel to each other. For example, both the axis 1009 and the axis 1011 can be substantially parallel to the longitudinal axis 1016. Also, in some embodiments, the motor shaft 1010 can protrude from the motor 1002 in the same direction that the reel shaft 1012 protrudes from the reel 1004. Furthermore, the motor shaft 1010 and the reel shaft 1012 can be spaced apart along the transverse axis 1018.

The transmission 1001 of the tensioning system 300 can include a gear train 1014 that includes a plurality gears that are arranged and enmeshed in a sequence. The gear train 1014 can transfer torque and power from the motor shaft 1010 to the reel shaft 1012.

The transmission 1001 can also include one or more intermediate shafts that support respective gears of the gear train 1014. For example, the transmission 1001 can include a first intermediate shaft 1096 and a second intermediate shaft 1086. In some embodiments, the first intermediate shaft 1096 and the second intermediate shaft 1086 can be supported by a first support member 1312 and a second support member 1314. In various examples, the first support member 1312 and the second support member 1314 can be supporting plates or other structures configured to seat ends 1098, 1100 of the first intermediate shaft 1096 and ends 1302, 1304 of the second intermediate shaft 1086.

As will be discussed, the gear train 1014 can provide a predetermined gear ratio and a predetermined gear reduction. Accordingly, as torque is transferred from the motor shaft 1010 to the reel shaft 1012, the gear train 1014 can reduce rotational speed while increasing torque. The gear ratio/reduction can be selected to provide reliable and effective power transfer from the motor shaft 1010 to the reel shaft 1012 when tightening and loosening the footwear 100. Also, it will be appreciated that once the footwear 100 is tightened on the foot, various forces can act to loosen the footwear 100. However, the gear ratio/reduction can be selected so the tensioning system 300 can resist these forces and to prevent inadvertent loosening of the footwear 100 from the foot.

The gear train 1014 can have various configurations without departing from the scope of the present disclosure. However, it will be appreciated that the gear train 1014 can vary from the illustrated embodiments without departing from the scope of the present disclosure.

The gear train 1014 can include a plurality of gears, including a first gear 1050, a second gear 1052, a third gear 1054, a fourth gear 1058, a fifth gear 1060, a sixth gear 1064, a seventh gear 1066, an eighth gear 1070, a ninth gear 1072, a tenth gear 1076, an eleventh gear 1078, and a twelfth gear 1082. In some embodiments, one or more of the gears of the gear train 1014 can be spur gears. However, the gears can be configured otherwise without departing from the scope of the present disclosure.

The gears of the gear train 1014 can have predetermined features that provide the desired gear ratio/reduction. For example, the gears can have predetermined diameters, pitch diameters, and other similar dimensions that are measured in the lateral direction 1018. Moreover, the number of teeth and the tooth profile of the gears can be preselected. Additionally, one or more gears can have a predetermined width, which is measured in the longitudinal direction 1016. Moreover, the gears can be made out of predetermined materials, such as polymers, metals, and/or composites.

The first gear 1050 can be mounted for rotation on the motor shaft 1010, proximate the second end 1022. In some embodiments, the first gear 1050 can be rotationally fixed to the motor shaft 1010 such that rotation of the motor shaft 1010 causes synchronous rotation of the first gear 1050. The first gear 1050 can be enmeshed with the second gear 1052.

The second gear 1052 can be mounted on the first intermediate shaft 1096. In some embodiments, the second gear 1052 can be mounted proximate a first end 1100 of the first intermediate shaft 1096. Also, in some embodiments, the second gear 1052 can be mounted for rotation relative to the first intermediate shaft 1096. For example, the second gear 1052 can be mounted on the first intermediate shaft 1096 via a bearing that allows the second gear 1052 to rotate independent of the first intermediate shaft 1096.

The third gear 1054 can also be mounted on the first intermediate shaft 1096, proximate the second gear 1052. In some embodiments, the third gear 1054 can be mounted for rotation relative to the first intermediate shaft 1096. For example, the third gear 1054 can be mounted on the first intermediate shaft 1096 via a bearing that allows the third gear 1054 to rotate independent of the first intermediate shaft 1096.

Additionally, in some embodiments, the third gear 1054 can be rotationally coupled to the second gear 1052. Accordingly, the third gear 1054 and second gear 1052 can cooperate to define a first compound gear 1056. Because they are rotationally coupled, the third gear 1054 can be configured to rotate in synch with the second gear 1052. In some embodiments, the third gear 1054 can be immediately adjacent and fixed to the second gear 1052. For example, the third gear 1054 and second gear 1052 can be stacked end-to-end and considered "in-series" so that the first compound gear 1056 is relatively compact.

Additionally, the third gear 1054 and the second gear 1052 can have different pitch diameters. It will be appreciated that the pitch diameters are measured along the transverse axis 1018. In the embodiments shown, the pitch diameter of the third gear 1054 can be less than the pitch diameter of the second gear 1052. Also, the third gear 1054 and the second gear 1052 can have different thicknesses. It will be appreciated that the thicknesses are measured along the longitudinal axis 1016. In the embodiments shown, the thickness of the third gear 1054 can be greater than the thickness of the second gear 1052. These dimensional differences between the third gear 1054 and the second gear 1052 can ensure that the desired gear ratio/reduction is achieved through the gear train 1014.

In some embodiments, the third gear 1054 and the second gear 1052 can be welded together, pressed together, keyed together, adhesively fixed, attached by fasteners or otherwise fixed together. In additional embodiments, the third gear 1054 and the second gear 1052 can be integrally connected so that the third gear 1054 and second gear 1052 define a monolithic, unitary, one-piece gear member 1056.

A second compound gear 1062 includes a fourth gear 1058, referred herein as a "ring gear" 1058. The ring gear 1058 includes or is otherwise coupled to a head 1320. The head 1320 can be annular and can have a substantially constant diameter, as measured along its length. The ring gear 1058 is fixedly secured to a shaft 1086 proximate a first end 1304 of the shaft 1086. In various examples, the shaft 1086 is a second intermediate shaft. The shaft 1086 variously includes as an integral component or is fixedly secured to a fifth gear 1060 proximate a second end 1302 of the shaft 1086. The fifth gear 1060 is engaged with a sixth gear 1064 which rotates about the first intermediate shaft 1096. The shaft 1086 and the fifth gear 1060 combined are collectively referred herein as an elongate shaft gear 1310. The ring gear 1058 and the elongate shaft gear 1310 combine to form the second compound gear 1062. As such, the ring gear 1058 and the elongate shaft gear 1310 are fixed with respect to one another for synchronous rotation.

The components which are fixedly secured with respect to one another can be secured according to any of a variety of modes. In various examples, the ring gear 1058 and the elongate shaft gear 1310 are fixedly secured with respect to one another by a press or friction fit. Additionally or alternatively, such individual components can be fixedly secured with respect to one another by welding, a fastener or other securing member, such as a key. Notwithstanding their individually identifiable components, the ring gear 1058 and the elongate shaft gear 1310 can be milled, machined, or otherwise formed from a single base material or can be formed as a single piece, e.g., by three-dimensional printing techniques.

The shaft 1086 is mounted for rotation on a first support member 1312 and the second support member 1314. In an example, the second intermediate shaft 1086 does not include bore and is instead substantially solid along a length of the shaft. As such, forming a bore can be avoided when manufacturing, which can increase manufacturing efficiency. Additionally, it can be easier to center the ring gear 1058 and the fifth gear 1060 about their common axis of rotation because there is no bore that extends through the shaft 1086. Moreover, the head 1320 can have greater wall thickness than can be possible with a bore, potentially making the second intermediate shaft 1086 stronger for transferring torque from the ring gear 1058 to the shaft gear 1310 than alternative shafts.

Because they are rotationally coupled, the fifth gear 1060 can be configured to rotate in synch with the fourth gear 1058. The fifth gear 1060 and fourth gear 1058 can be rotationally coupled by assembling multiple parts together. In other embodiments, the fifth gear 1060 and fourth gear 1058 can be integrally connected so that the second compound gear 1062 is monolithic and unitary.

The sixth gear 1064 can be mounted on the first intermediate shaft 1096, proximate the second end 1098. In some embodiments, the sixth gear 1064 can be mounted for rotation relative to the first intermediate shaft 1096.

The seventh gear 1066 can also be mounted on the first intermediate shaft 1096, proximate the sixth gear 1064. Like the sixth gear 1064, the seventh gear 1066 can be mounted for rotation relative to the first intermediate shaft 1096.

Additionally, in some embodiments, the seventh gear 1066 can be rotationally coupled to the sixth gear 1064. Accordingly, the seventh gear 1066 and sixth gear 1064 can cooperate to define a third coupled gear member 1068. Because they are rotationally coupled, the seventh gear 1066 can be configured to rotate in synch with the sixth gear 1064. The seventh gear 1066 and sixth gear 1064 can be rotationally coupled by assembling multiple parts together. In other embodiments, the seventh gear 1066 and sixth gear 1064 can be integrally connected so that the third coupled gear member 1068 is monolithic and unitary.

Furthermore, the eighth gear 1070 can be mounted on the reel shaft 1012, proximate the second end 1015. In some embodiments, the eighth gear 1070 can be mounted for rotation relative to the reel shaft 1012. The ninth gear 1072 can also be mounted on the reel shaft 1012, proximate the eighth gear 1070. Like the eighth gear 1070, the ninth gear 1072 can be mounted for rotation relative to the reel shaft 1012.

Additionally, in some embodiments, the ninth gear 1072 can be rotationally coupled to the eighth gear 1070. Accordingly, the ninth gear 1072 and eighth gear 1070 can cooperate to define a fourth coupled gear member 1074. Because they are rotationally coupled, the ninth gear 1072 can be configured to rotate in synch with the eighth gear 1070. The ninth gear 1072 and eighth gear 1070 can be rotationally coupled by assembling multiple parts together. In other embodiments, the ninth gear 1072 and eighth gear 1070 can be integrally connected so that the fourth coupled gear member 1074 is monolithic and unitary.

Moreover, the tenth gear 1076 can be mounted on the first intermediate shaft 1096, between the first compound gear 1056 and the third coupled gear member 1068. In some embodiments, the tenth gear 1076 can be mounted for rotation relative to the first intermediate shaft 1096.

The eleventh gear 1078 can also be mounted on the first intermediate shaft 1096, proximate the tenth gear 1076. Specifically, the eleventh gear 1078 can be proximate the third gear 1054 of the first compound gear 1056, whereas the tenth gear 1076 can be proximate the seventh gear 1066 of the third coupled gear member 1068. Like the tenth gear 1076, the eleventh gear 1078 can be mounted for rotation relative to the first intermediate shaft 1096.

Additionally, in some embodiments, the eleventh gear 1078 can be rotationally coupled to the tenth gear 1076. Accordingly, the eleventh gear 1078 and tenth gear 1076 can cooperate to define a fifth coupled gear member 1080. Because they are rotationally coupled, the eleventh gear 1078 can be configured to rotate in synch with the tenth gear 1076. The eleventh gear 1078 and tenth gear 1076 can be rotationally coupled by assembling multiple parts together. In other embodiments, the eleventh gear 1078 and tenth gear 1076 can be integrally connected so that the fifth coupled gear member 1080 is monolithic and unitary.

Finally, the twelfth gear 1082 can be mounted on the reel shaft 1012, proximate the first end 1013. In some embodiments, the twelfth gear 1082 can be fixed to rotate in synch with the reel shaft 1012.

Figure 5:
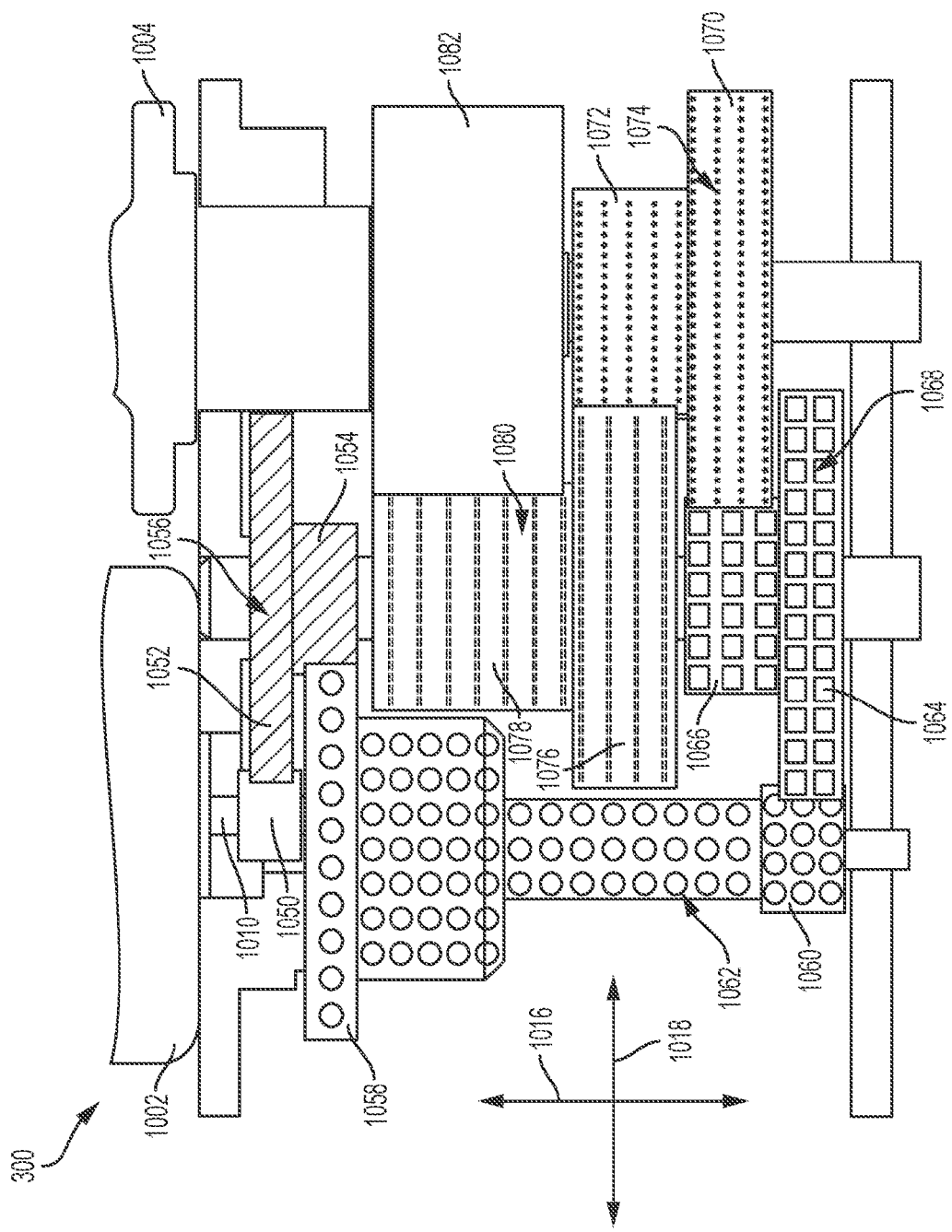
FIG. 5 is a depiction of how various gears of the transmission system 1001 are enmeshed together, in an example embodiment.

FIG. 5 is a depiction of how various gears of the transmission system 1001 are enmeshed together, in an example embodiment. As illustrated, predetermined pairs of gears within the gear train 1014 can be enmeshed together. Specifically, the first gear 1050 can be enmeshed with the second gear 1052. Also, the third gear 1054 can be enmeshed with the fourth gear 1058. The fifth gear 1060 can be enmeshed with the sixth gear 1064. The seventh gear 1066 can be enmeshed with the eighth gear 1070. The ninth gear 1072 can be enmeshed with the tenth gear 1076. Finally, the eleventh gear 1078 can be enmeshed with the twelfth gear 1082. Accordingly, torque and power can be transferred from the motor shaft 1010 to the reel shaft 1012. The gear train 1014 can remain enmeshed, and a separate clutch, brake, or other components may not be needed. Stated differently, the transmission 1001 can be clutchless and/or brakeless. Moreover, the gear train 1014 can provide a single, constant gear reduction for the transmission 1001.

The first compound gear 1056 is illustrated schematically via diagonal cross-hatching that is unique to the first compound gear 1056. The second compound gear 1062 is illustrated schematically via a cross-hatching pattern that includes circles. The third coupled gear member 1068 is illustrated schematically via a cross-hatching pattern that includes rectangles. The fourth coupled gear member 1074 is illustrated schematically via a cross-hatching pattern that includes asterisks. The fifth coupled gear member 1080 is illustrated schematically via a cross-hatching pattern that includes "=" symbols.

Figure 6:
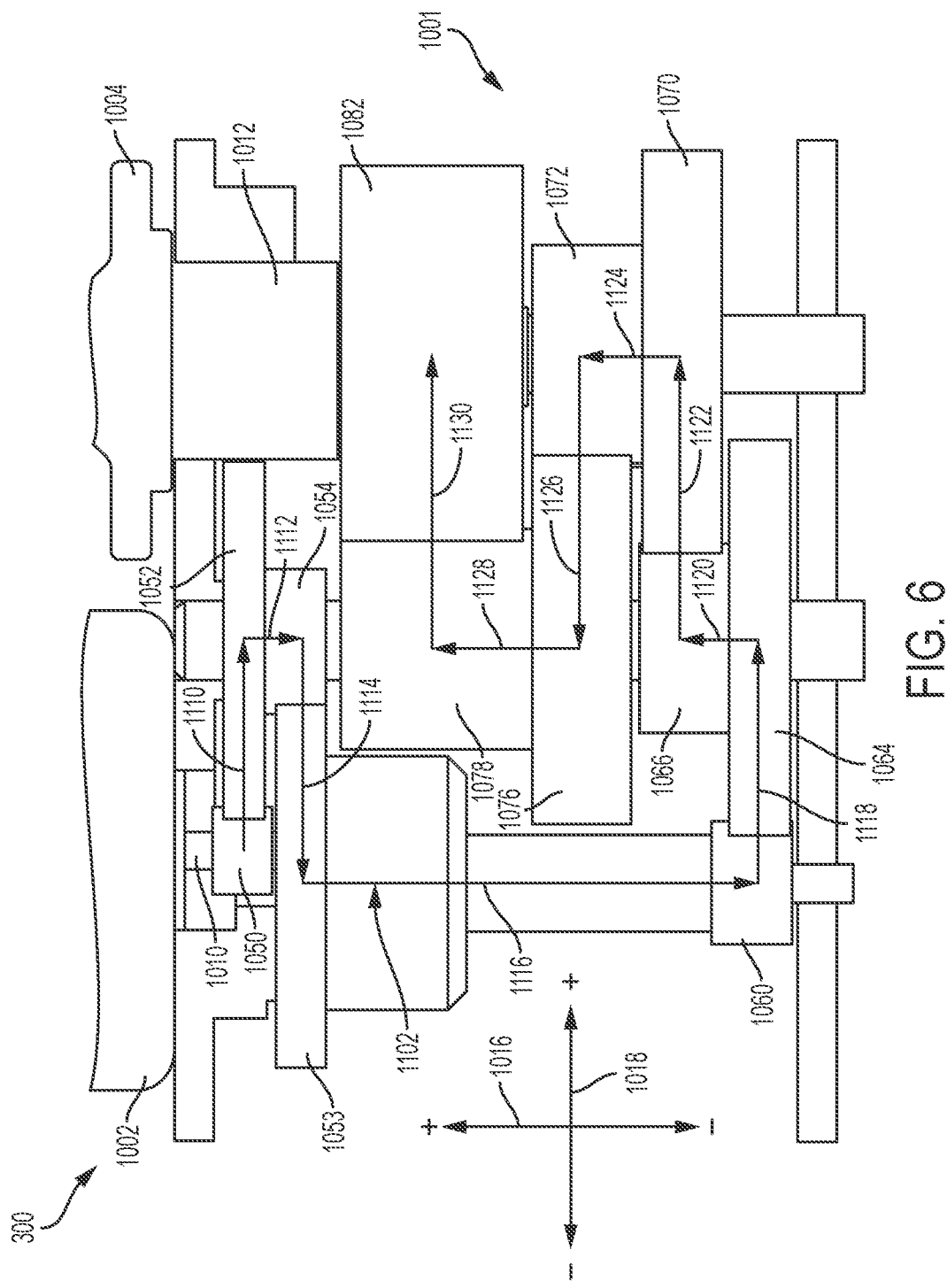
FIG. 6 illustrates a torque path 1102 of the transmission 1001, in an example embodiment.

FIG. 6 illustrates a torque path 1102 of the transmission 1001, in an example embodiment. The torque path 1102 can be multi-directional as it extends between the motor shaft 1010 and the reel shaft 1012. For example, in some embodiments, the torque path 1102 can extend in one direction along the longitudinal axis 1016 and can later reverse in the opposite direction at least once along the longitudinal axis 1016. Likewise, in some embodiments, the torque path 1102 can extend in one direction along the transverse axis 1018 and can later reverse in the opposite direction at least once along the transverse axis 1018.

In the illustrated embodiment, rotation of the motor shaft 1010 can rotate the first gear 1050. Thus, the first gear 1050 can be considered the input gear or motor gear that inputs torque to the transmission 1001. Also, torque transfer through the transmission 1001 can rotate the twelfth gear 1082, which ultimately rotates the reel 1004. Thus, the twelfth gear 1082 can be considered the output gear or reel gear that outputs torque to the reel 1004. The other gears can be considered intermediate gears, which transfer torque from the first gear 1050 to the twelfth gear 1082.

Torque can travel along the torque path 1102 in the following sequence: from the first gear 1050, to the second gear 1052, to the third gear 1054, to the fourth gear 1058, to the fifth gear 1060, to the sixth gear 1064, to the seventh gear 1066, to the eighth gear 1070, to the ninth gear 1072, to the tenth gear 1076, to the eleventh gear 1078, and finally to the twelfth gear 1082.

In some embodiments, the torque path 1102 can change directions multiple times. Also, in some embodiments, the torque path 1102 can reverse directions. For example, a portion of the torque path 1102 can extend in one direction along the longitudinal axis 1016, and another portion of the torque path 1102 can extend in the opposite direction along the longitudinal axis 1016. Additionally, a portion of the torque path 1102 can extend in one direction along the transverse axis 1018, and another portion of the torque path 1102 can extend in the opposite direction along the transverse axis 1016. This can allow the transmission 1001 to be more compact. Additionally, in some embodiments, the torque path 1102 can extend in a serpentine fashion through the transmission 1001. For example, the torque path 1102 can alternate and reverse directions along the transverse axis 1018 as the torque path 1102 advances along the longitudinal axis 1016.

For reference purposes, positive and negative directions are indicated on the longitudinal axis 1016 and the transverse axis 1018. Additionally, for purposes of discussion, the torque path 1102 is subdivided into a plurality of segments.

As shown, a first segment 1110 of the torque path 1102 can extend from the first gear 1050 to the second gear 1052. As such, the first segment can extend in the positive direction along the transverse axis 1018. Also, a second segment 1112 of the torque path 1102 can extend from the second gear 1052 to the third gear 1054, and the second segment 1112 can extend in the negative direction along the longitudinal axis 1016. Then, a third segment 1114 can extend from the third gear 1054 to the fourth gear 1058 and also in the negative direction along the transverse axis 1018. Additionally, a fourth segment 1116 can extend in the negative direction along the longitudinal axis 1016 as the fourth segment 1116 extends from the fourth gear 1058 to the fifth gear 1060. Then, a fifth segment 1118 can extend in the positive direction along the transverse axis 1018 as the fifth segment 1118 extends from the fifth gear 1060 to the sixth gear 1064. Additionally, a sixth segment 1120 of the torque path 1102 can extend in the positive direction along the longitudinal axis 1016 as the sixth segment 1120 extends from the sixth gear 1064 to the seventh gear 1066. Furthermore, a seventh segment 1122 can extend in the positive direction along the transverse axis 1018 as the seventh segment 1122 extends from the seventh gear 1066 to the eighth gear 1070. Also, an eighth segment 1124 can extend in the positive direction along the longitudinal axis 1016 as the eighth segment 1124 extends from the eighth gear 1070 to the ninth gear 1072. Then, a ninth segment 1126 of the torque path 1102 can extend in the negative direction along the transverse axis 1018 as it extends from the ninth gear 1072 to the tenth gear 1076. Also, a tenth segment 1128 can extend in the positive direction along the longitudinal axis 1016 as the tenth segment 1128 extends from the tenth gear 1076 to the eleventh gear 1078. Finally, an eleventh segment 1130 of the torque path 1102 can extend in the positive direction along the transverse axis 1018 as the eleventh segment 1130 extends from the eleventh gear 1078 to the twelfth gear 1082.

Thus, in the illustrated embodiment, the direction of the first segment 1110 of the torque path 1102 can be opposite the direction of the third segment 1114. Likewise, the direction of the third segment 1114 can be opposite the direction of the fifth segment 1118. Moreover, the direction of the fourth segment 1116 can be opposite the direction of the sixth segment 1120. Additional segments are opposite each other as well. Moreover, the sixth segment 1120, seventh segment 1122, eighth segment 1124, ninth segment 1126, tenth segment 1128, and eleventh segment 1130 can extend in a serpentine fashion—back and forth along the transverse axis 1018 as torque is transferred along the longitudinal axis 1016.

Because the torque path 1102 changes direction so many times, a relatively large number of gears can be included within the gear train 1014, and yet the transmission 1001 can be relatively compact. Also, with the high number of gears included in the gear train 1014, the gear train 1014 can collectively achieve a very high gear ratio. As such, the rotational speed of the motor shaft 1010 can be reduced while torque is increased along the torque path 1102. In some embodiments, the gear ratio can be at least 300:1. In additional embodiments, the gear ratio can be at least 400:1. In still additional embodiments, the gear ratio can be at least 410:1. In one embodiment, the gear ratio can be approximately 418.6:1.

In the illustrated example, the gear ratio from the first gear 1050 to the second gear 1052 is approximately 4.6:1. The gear ratio from the third gear 1054 to the fourth gear 1058 is approximately 2.8:1. Also, the gear ratio from the fifth gear 1060 to the sixth gear 1064 is approximately 3.8:1. Moreover, the gear ratio from the seventh gear 1066 to the eighth gear 1070 is approximately 2.5:1. Furthermore, the gear ratio from the ninth gear 1072 to the tenth gear 1076 is approximately 1.9:1. Finally, the gear ratio from the eleventh gear 1078 to the twelfth gear 1082 is approximately 1.9:1. Collectively, the gear train 1014 can provide a gear ratio from the first gear 1050 to the twelfth gear 1082 at approximately 418.6:1.

With such a gear ratio, the tensioning system 300 can provide relatively strong and reliable winding torque to the reel 1004, providing for the tensioning member 137 to tighten the securement system 130 and secure the footwear 100 to the wearer's foot. Also, when the footwear 100 is secured to the foot, the wearer's jumping, running, or other activities can pull the tensioning member 137 away from the reel 1004. However, the high gear ratio provided by the gear train 1014 can provide a mechanical advantage for resisting these forces. Thus, once the tensioning member 137 is spooled on the reel 1004, the transmission 1001 can retain the tensioning member 137 in the spooled and secured position. It will be appreciated that the transmission 1001 can resist unwinding of the reel 1004 even without use of a brake. The gears of the gear train 1014 can remain enmeshed. Thus, a clutch may not be necessary. In other words, a single, consistent gear ratio is provided that is very high. Also, the motor can be OFF and de-energized, and yet the electromagnetic force of the motor 1002 can be enough to retain the reel 1004 in position due to the mechanical advantage provided by the high gear ratio of the gear train 1014. Frictional forces within the gear train 1014 can also aid in retaining the reel 1004 in position.

If the wearer does wish to loosen the footwear 100 from the foot, the wearer can energize the motor 1002 in the opposite direction. The motor shaft 1010 can rotate in the opposite direction, and the transmission 1001 can transfer power to the reel 1004, causing the reel shaft 1012 to rotate in the opposite direction.

Figure 7:
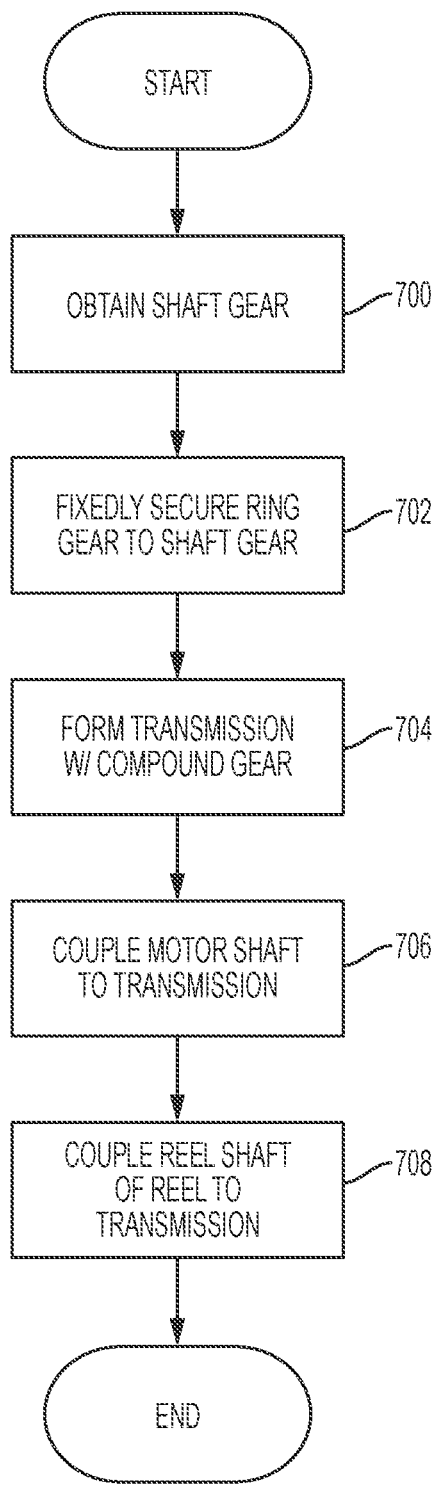
FIG. 7 is a flowchart for making a tensioning system, in an example embodiment.

FIG. 7 is a flowchart for making a tensioning system, in an example embodiment. The flowchart is described with respect to the tensioning system 300, though it is noted that the flowchart may be utilized to make any suitable tensioning system or other structure or apparats.

At 700, a shaft gear comprising an elongate shaft is obtained.

At 702, a ring gear is fixedly coupled to a first end of the shaft gear to form a compound gear. In an example, fixedly coupling the ring gear to the shaft gear is with a press fit. In an example, the ring gear forms a hole and fixedly coupling the ring gear to the shaft gear is press fitting the shaft gear inside the hole.

At 704, a transmission is formed with the compound gear, in part by securing the shaft gear to rotate independent of a fixed reference, the elongate shaft substantially parallel to a longitudinal axis of the transmission. In an example, the fixed reference is a support member and wherein forming the transmission comprises seating a second end of the shaft gear opposite the first end in the support member. In an example, forming the transmission includes mounting an intermediate gear on an intermediate shaft and seating the intermediate shaft in the support member and parallel to the shaft gear and offset with respect to the shaft gear along the lateral axis. In an example, forming the transmission further comprises seating the reel shaft in the support member. In an example, the ring gear forms a hole, wherein the support member is a first support member and wherein forming the transmission further comprises seating a second support member in part within the hole proximate the first end of the shaft gear.

At 706, a motor shaft of a motor is coupled to the transmission, the elongate shaft offset with respect to the motor shaft along a later al axis.

At 708, a reel shaft of a reel is coupled to the transmission, the reel configured to spool a tensioning member, wherein the reel shaft, the motor shaft, and the shaft gear are substantially parallel to a longitudinal axis, the motor shaft, the reel shaft, and the shaft gear being spaced apart along the lateral axis.

While various embodiments have been described, the description is intended to be exemplary, rather than limiting and it will be apparent to those of ordinary skill in the art that many more embodiments and implementations are possible that are within the scope of the present disclosure. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A tensioning system for adjusting a tensioning member of an article of footwear comprising:
   a reel configured to spool the tensioning member, the reel comprising a reel shaft;
   a motor comprising a motor shaft, the motor shaft and the reel shaft being parallel to a longitudinal axis, the motor shaft being spaced apart from the reel shaft along a lateral axis; and
   a transmission configured to transmit torque from the motor shaft to the reel shaft along a torque path to drive and rotate the reel shaft, the transmission comprising:
   a compound gear, comprising:
   a shaft gear, comprising an elongate shaft substantially parallel to the longitudinal axis and offset with respect to the motor shaft along the lateral axis, the shaft gear configured to rotate independent of a fixed reference, the shaft gear operatively coupled to the reel and including a shaft component and a gear component secured to the shaft component at a second end of the shaft component, wherein the fixed reference is a support member and wherein a second end of the shaft gear opposite the first end is seated in the support member; and
   a ring gear, fixedly coupled to a first end of the shaft component opposite the second end and operatively coupled to the motor, wherein the ring gear includes a hole, wherein the support member is a first support member and wherein the transmission further comprises a second support member seated in part within the hole proximate the first end of the shaft gear.

2. The tensioning system of claim 1, wherein the ring gear is fixedly coupled to the shaft gear with a press fit.

3. The tensioning system of claim 2, wherein the shaft gear is press fit inside the hole.

4. The tensioning system claim 1, wherein the transmission further comprises an intermediate gear and an intermediate shaft parallel to the shaft gear and offset with respect to the shaft gear along the lateral axis, the intermediate gear mounted on the intermediate shaft and the intermediate shaft seated in the support member.

5. The tensioning system of claim 4, wherein the reel shaft is seated in the support member.

6. An article of footwear, comprising:
   an upper section configured to seat a tensioning member to secure the article of footwear to a foot;
   a sole section, secured to the upper;
   a reel, seated in the sole section, configured to spool the tensioning member, the reel comprising a reel shaft;
   a motor, seated in the sole section, comprising a motor shaft, the motor shaft and the reel shaft being parallel to a longitudinal axis, the motor shaft being spaced apart from the reel shaft along a lateral axis; and
   a transmission, seated in the sole section, configured to transmit torque from the motor shaft to the reel shaft along a torque path to drive and rotate the reel shaft, the transmission comprising:
   a compound gear, comprising:
   a shaft gear, comprising an elongate intermediate shaft substantially parallel to the longitudinal axis and offset with respect to the motor shaft along the lateral axis, the shaft gear configured to rotate independent of a fixed reference, the shaft gear operatively coupled to the reel and including a shaft component and a gear component secured to the shaft component at a second end of the shaft component, wherein the fixed reference is a support member and wherein a second end of the shaft gear opposite the first end is seated in the support member; and
   a ring gear, fixedly coupled to a first end of the shaft component opposite the second end and operatively coupled to the motor, wherein the ring gear includes a hole, wherein the support member is a first support member and wherein the transmission further comprises a second support member seated in part within the hole proximate the first end of the shaft gear.

7. The article of footwear of claim 6, wherein the ring gear is fixedly coupled to the shaft gear with a press fit.

8. The article of footwear of claim 7, wherein the shaft gear is press fit inside the hole.

9. The article of footwear of claim 6, wherein the transmission further comprises an intermediate gear and an intermediate shaft parallel to the shaft gear and offset with respect to the shaft gear along the lateral axis, the intermediate gear mounted on the intermediate shaft and the intermediate shaft seated in the support member.

10. The article of footwear of claim 9, wherein the reel shaft is seated in the support member.

* * * * *